US011062225B2

United States Patent
Vlassis et al.

(10) Patent No.: US 11,062,225 B2
(45) Date of Patent: Jul. 13, 2021

(54) TECHNIQUES FOR PROVIDING SEQUENTIAL RECOMMENDATIONS TO USERS

(71) Applicant: Adobe Inc., San Jose, CA (US)

(72) Inventors: Nikolaos Vlassis, San Jose, CA (US); Georgios Theocharous, San Jose, CA (US)

(73) Assignee: ADOBE INC., San Jose, CA (US)

( * ) Notice: Subject to any disclaimer, the term of this patent is extended or adjusted under 35 U.S.C. 154(b) by 765 days.

(21) Appl. No.: 15/373,849

(22) Filed: Dec. 9, 2016

(65) Prior Publication Data

US 2018/0165590 A1    Jun. 14, 2018

(51) Int. Cl.
| | |
|---|---|
| *G06N 7/00* | (2006.01) |
| *G06N 20/00* | (2019.01) |
| *G06F 16/9535* | (2019.01) |
| *G06N 5/04* | (2006.01) |

(52) U.S. Cl.
CPC ......... *G06N 7/005* (2013.01); *G06F 16/9535* (2019.01); *G06N 5/045* (2013.01); *G06N 20/00* (2019.01)

(58) Field of Classification Search
CPC ........ G06N 7/005; G06N 20/00; G06N 5/045; G06F 16/9535
See application file for complete search history.

(56) References Cited

U.S. PATENT DOCUMENTS

| | | | | |
|---|---|---|---|---|
| 7,966,276 B2 * | 6/2011 | Cade | ....................... | G05B 17/02 706/47 |
| 8,478,642 B2 * | 7/2013 | Dey | ................. | G08G 1/096844 705/14.4 |
| 8,527,434 B2 * | 9/2013 | Noda | ................... | G06K 9/6297 706/12 |

(Continued)

FOREIGN PATENT DOCUMENTS

WO    WO-2014018687 A1 *   1/2014   ............... G06N 5/04

OTHER PUBLICATIONS

Bin Liu, Learning Geographical Preferences for Point-of-Interest Recommendation, 2013, Proceedings of the 19th ACM SIGKDD international conference on Knowledge discovery and data mining, pp. 1043-1051. (Year: 2013).*

(Continued)

*Primary Examiner* — Alexey Shmatov
*Assistant Examiner* — Ahsif A. Sheikh
(74) *Attorney, Agent, or Firm* — Kilpatrick Townsend & Stockton LLP

(57) ABSTRACT

Certain embodiments involve generating personalized recommendations for users by inferring a propensity of each individual user to accept a recommendation. For example, a system generates a personalized user model based on a historical transition matrix that provides state transition probabilities from a general population of users. The probabilities are adjusted based on the propensity for a user to accept a recommendation. The system determines a recommended action for the user to transition between predefined (Continued)

states based on the user model. Once the user has performed an activity that transitions from a current state, the system adjusts a probability distribution for an estimate of the propensity based on whether the activity is the recommended action.

17 Claims, 4 Drawing Sheets

(56) References Cited

U.S. PATENT DOCUMENTS

| | | | | |
|---|---|---|---|---|
| 10,290,221 | B2* | 5/2019 | Stacy | G09B 7/00 |
| 2009/0222346 | A1* | 9/2009 | Greene | G06Q 30/0273 |
| | | | | 705/14.53 |
| 2017/0169478 | A1* | 6/2017 | Dey | G06Q 30/0271 |
| | | | | 705/14.49 |

OTHER PUBLICATIONS

Matthijs T. J. Spaan, Perseus: Randomized Point-based Value Iteration for POMDPs, 2005, Journal of Artificial Intelligence Research, 195-220 (Year: 2005).*

Aditya Gopalan,Thompson Sampling for Learning Parameterized Markov Decision Processes, 2015, JMLR: Workshop and Conference Proceedings vol. 40: pp. 1-38. (Year: 2015).*

Lu, Zhongqi & Yang, Qiang. Partially Observable Markov Decision Process for Recommender Systems. (2016). pp. 1-9 (Year: 2016).*

Cheng, Chen, et al., "Fused Matrix Factorization With Geographical and Social Influence in Location-Based Social Networks", In Twenty-Sixth AAAI Conference on Artificial Intelligence, Jul. 2012, 7 pages.

Feng, Shanshan, et al., "Personalized Ranking Metric Embedding for Next New POI Recommendation", In Proceedings of the 24th International Conference on Artificial Intelligence, IJCAI, Jul. 2015, 7 pages.

Gao, Huiji, et al., "Exploring Temporal Effects for Location Recommendation on Location-Based Social Networks" In Proceedings of the 7th ACM conference on Recommender systems, ACM, 2013, 8 pages.

Gopalan, Aditya, et al., "Thompson Sampling for Learning Parameterized Markov Decision Processes", JMLR: Workshop and Conference Proceedings, vol. 40, 2015 38 pages.

Koren, Yehuda, et al., "Matrix Factorization Techniques for Recommender Systems", Computer, (8):30-37, 2009, 8 pages.

Li, Xutao, et al., "Rank-GeoFM: A Ranking Based Geographical Factorization Method for Point of Interest Recommendation", In Proceedings of the 38th International ACM SIGIR Conference on Research and Development in Information Retrieval, ACM, 2015, 10 pages.

Lian, Defu, et al., "GeoMF: Joint Geographical Modeling and Matrix Factorization for Point-Of-Interest Recommendation", In Proceedings of the 20th ACM SIGKDD International Conference on Knowledge Discovery and Data Mining, ACM, 2014, 10 pages.

Liu, Bin, et al., "Learning Geographical Preferences for Point-Of-Interest Recommendation", In Proceedings of the 19th ACM SIGKDD International Conference on Knowledge Discovery and Data Mining, ACM, 2013, 9 pages.

Spaan, Matthijs, et al., "Perseus: Randomized Point-Based Value Iteration for POMDPS", Journal of Artificial Intelligence Research, 2005, 26 pages.

Theocharous, Georgios, et al., "Approximate Planning in POMDPs with Macro-Actions", In Advances in Neural Information Processing Systems, 2003, 8 pages.

Ye, Mao, et al., "Location Recommendation for Location-Based Social Networks", In Proceedings of the 18th SIGSPATIAL International Conference on Advances in Geographic Information Systems ACM, 2010.

Ye, Mao, et al., Exploiting Geographical Influence for Collaborative Point-Of-Interest Recommendation, In Proceedings of the 34th international ACM SIGIR Conference on Research and Development in Information Retrieval, ACM, 201, 10 pages.

Yu, Yonghong, "A Survey of Point-Of-Interest Recommendation in Location-Based Social Networks", In Workshops at the Twenty-Ninth AAAI Conference on Artificial Intelligence, 2015, 8 pages.

Yuan, Quan, et al., "Time-Aware Point-Of-Interest Recommendation", In Proceedings of the 36th International ACM SIGIR Conference on Research and Development Information Retrieval, ACM, 2013, 10 pages.

Zhang, Jia-Dong, et al., iGeoRec: A Personalized and Efficient Geographical Location Recommendation Framework, IEEE, 2014, 14 pages.

Zhang, Jia-Dong, et al., "LORE: Exploiting Sequential Influence for Location Recommendations", In Proceedings of the 22nd ACM SIGSPATIAL International Conference on Advances in Geographic Information Systems, ACM, 2014, 10 pages.

Ye, Mao, et al., "Location Recommendation for Location-Based Social Networks", In Proceedings of the 18th SIGSPATIAL International Conference on Advances in Geographic Information Systems ACM, 2010, 4 pages.

* cited by examiner

TECHNIQUES FOR PROVIDING SEQUENTIAL RECOMMENDATIONS TO USERS

TECHNICAL FIELD

This disclosure generally relates to machine-learning and more specifically relates to applying machine-learning to analyze large volumes of digitally-collected user behavior data in order to generate personalized recommendations in digital applications.

BACKGROUND

Certain computing applications use various methods and techniques to recommend actions to a user (e.g., recommend an offer to be provided to a user, recommend a location to a user, or recommend sports, news, weather, etc. to a user). The computing applications recommend actions to the user based on various data about the user including, for example, user preferences or location. These recommendations allow online content of interest to the user to be automatically provided to the user, thereby providing a more rewarding, customized user experience.

An important aspect of successful recommendations is personalization, i.e., the ability to provide suggestions that are highly relevant to each individual user. For example, in the context of mobile points-of-interest (POI) recommendations, personalized recommendations would be POI that are pertinent to the goals or preferences of the user, but those preferences are often hidden to the recommendation system.

Existing recommendation solutions involve disadvantages in this regard. A particularly challenging problem is how to learn (i.e., estimate) those hidden user preferences in real-time, and adapt the recommendations accordingly. For example, a computing application using inaccurately learned user preferences can cause the computing application to inaccurately predict recommendations to be provided to the user.

Thus, existing machine-learning systems present disadvantages such as, but not limited to, those discussed above. For these and other reasons, improved techniques for learning user preferences and predicting subsequent user behavior are therefore desirable.

SUMMARY

Various embodiments of the present disclosure provide systems and methods for generating recommendations for users, such as point-of-interest recommendations, using an automated approach that is personalized by inferring the propensity of each individual user to listen to recommendations. In one example, a method receives a first location of a user. The first location is proximate to a location included in a collection of predefined locations. A personalized user model is generated based on a historical transition matrix that provides location transition probabilities from a general population of users. The probabilities are adjusted in the user model based on a propensity for the user to accept a recommendation. The method further determines a first recommended location for the user from among the predefined locations by using a recommendation engine configured with the user model. The first recommended location is presented to the user. Once it has been determined that the user has moved to a second location, the method further adjusts a probability distribution for an estimate of the propensity for the user to accept a recommendation based on whether the second location is the first recommended location. The method further determines a second recommended location for the user by using the recommendation engine configured with the user model and the adjusted estimate of the propensity for the user to accept a recommendation. Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
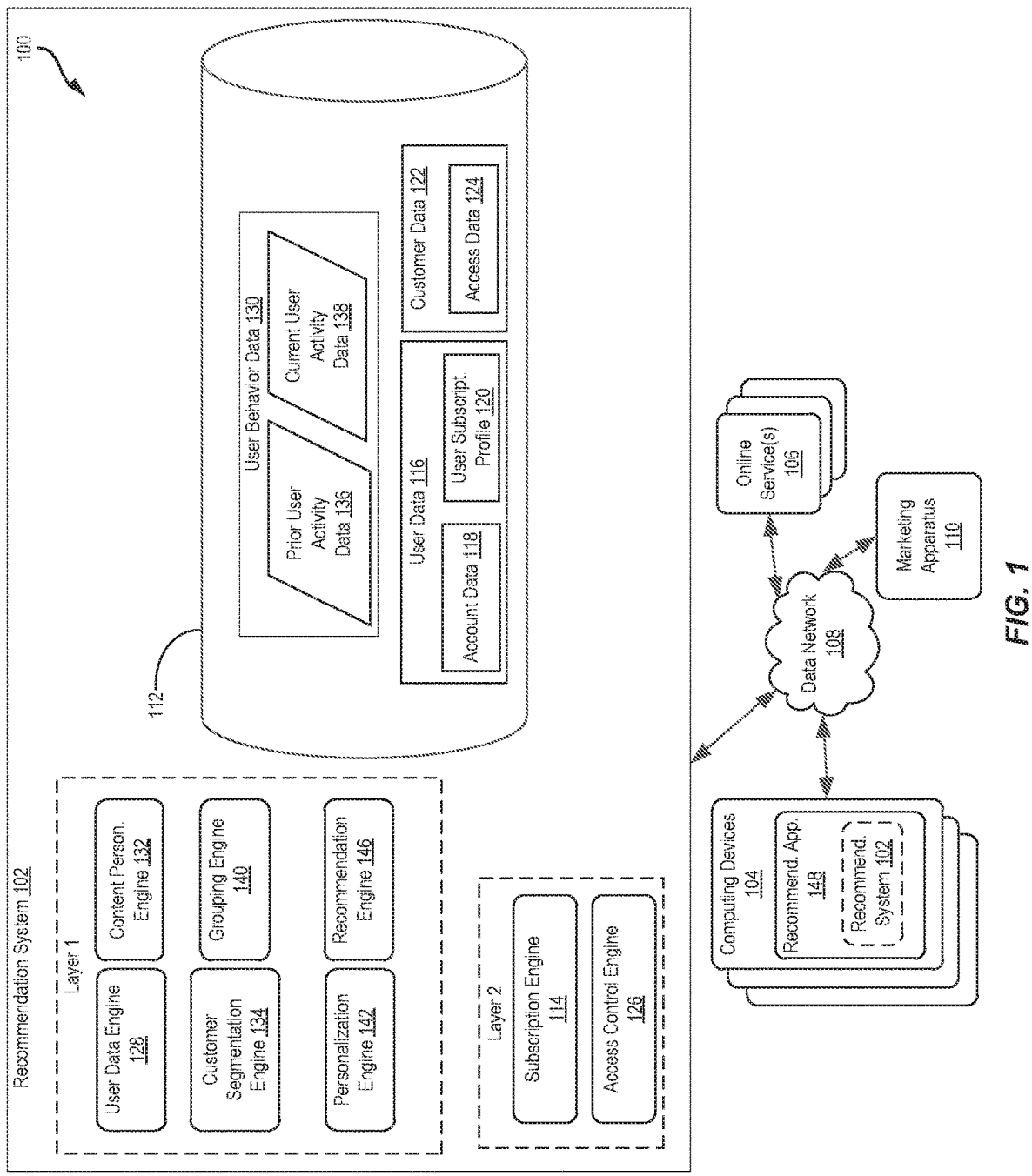
FIG. 1 is an example of a computing environment in which a recommendation system learns a propensity for a user to accept a recommendation and predicts user behavior based on sequential user behavior data to improve recommendation of various actions to the user, according to certain embodiments.

Various embodiments of the present disclosure involve generating recommendations for users, such as point-of-interest recommendations, by using machine-learning to analyze digitally-collected user behavior data from potentially hundreds of thousands of users, whereby the recommendations are personalized by inferring, in real time, the propensity of each individual user to listen to recommendations. For instance, a point-of-interest recommendation system, which is accessible via an online service implemented by one or more computing devices, obtains data about sequences of prior activities undertaken by a population of hundreds of thousands of users, such as the sequences of locations visited by the various users from among thousands of possible locations. The recommendation system further determines a historical transition matrix that provides location transition probabilities based on the sequences of prior activities of the population of users. For example, the transition matrix may specify, for each location (i.e., a state), the probabilities that users would transition to each of the other locations. Given the possibility of hundreds of thousands of users transitioning among thousands of possible locations, a vast amount of data is collected and compiled to produce the historical transition matrix that itself can comprise millions of probabilities for transitioning between locations. Using the transition matrix generated from the population of users, the recommendation system generates a user model that is a personalized model of a particular user's behavior. The probabilities are adjusted in the user model based on the propensity for the user to accept a recommendation, as described in further detail in the examples below. In various implementations, the user model can provide the state transition probabilities for each possible value of a user's propensity to accept a recommendation, thus resulting in an enormous amount of data to be stored and evaluated each time a recommendation is produced. In some implementations, the user model is expressed as a Partially Observable Markov Decision Process (POMDP) that is converted from the transition matrix. The POMDP models a decision process in which decisions, such as recommendations, are made in light of uncertainty as to one or more hidden states associated with the decision process, such as an individual user's propensity to listen to a recommendation.

The recommendation system generates and transmits recommendations to smart phones or other computing devices associated with users. As recommendations are provided to a given user, the recommendation system further obtains data about a current activity of the user (e.g., whether the user did or did not accept the recommendation to move to a particular location) and determines an adjustment to the estimate of the user's propensity to accept a recommendation based on whether the current activity is the recommended action. In some implementations, the user's propensity to accept a recommendation is expressed as a probability distribution over a range of possible values of the propensity, and the adjustment to the user's propensity is performed by updating the probability corresponding to each possible propensity value with an adjustment indicating the likelihood of the current activity having occurred if the true value of the propensity (i.e., an unobservable hidden state) was the respective propensity value. The recommendation system uses the adjusted propensities to provide additional recommendations that are better suited to a particular user (e.g., recommendations that are more likely to be helpful or interesting to the user).

As described above, existing systems for recommending actions to a user do not account for the propensity of a user to listen to recommendations, which can cause the systems to provide recommendations to a user that may not accurately reflect the user's interest. Certain embodiments presented herein provide significant improvements over existing systems that result in more appealing recommendations to users by estimating, in real time, a user's propensity to listen to provided recommendations. This estimate is performed based on user behaviors, and therefore does not require revealing explicitly stated user preferences (e.g., preferred activities) to the recommendation system, and hence the system estimates the propensity of the user to listen in real time. For example, a recommendation system infers latent user properties (e.g., fatigue, distraction, etc.) of a user at a particular location (e.g., a theme park) and uses these latent properties to estimate a user's propensity to follow the given point-of-interest recommendations. Accounting for the user's propensity allows the recommendation system to provide more effective, personalized recommendations.

As used herein, the term "state" is used to refer to any data associated with a user. Examples of data associated with a user include, but are not limited to, a location of a user, a history of locations of the user, a series or sequence of locations of the user, demographic data about the user, transaction data associated with the user, or any other data associated with the user.

As used herein, the term "trajectory" is used to refer to any data indicating sequence, series, or group of states. An example of a trajectory includes, but is not limited to, a series of locations of a user.

As used herein, the term "action" is used to refer to a recommended activity that, if performed, would result in a transition to a different state for the user. For example, an action may be a recommendation that the user move from a first location to a second location (i.e., transitioning from a first state to a second state).

As used herein, the term "activity" is used to refer to a movement or any other behavior by a user.

As used herein, the term "online service" is used to refer to one or more computing resources, including computing systems that may be configured for distributed processing operations, that provide one or more applications accessible via a data network. The collection of computing resources can be represented as a single service. In some embodiments, an online service provides a digital hub for browsing, creating, sharing, and otherwise using electronic content using one or more applications provided via the online service.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is an example of a computing environment 100 in which a recommendation system 102 learns user preferences and predicts user behavior based on sequential user behavior data to improve recommendation of various actions to a user, according to certain embodiments. The computing environment 100 includes the recommendation system 102 (which can be included in or otherwise used by a marketing apparatus), one or more computing devices 104, and one or more online services 106. The recommendation system 102, computing devices 104, and online services 106 are communicatively coupled via one or more data networks 108 (e.g., the Internet, one or more local area networks (LANs), one or more wide area networks (WANs), or some combination thereof).

Each of the computing devices 104 is connected (or otherwise communicatively coupled) to a marketing apparatus 110 via the data network 108. A user of one of the computing devices 104 uses various products, applications, or services supported by the marketing apparatus 110 via the data network 108. Examples of the users include, but are not limited to, marketing professionals who use digital tools to generate, edit, track, or manage online content, or to manage online marketing processes, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used for performing a function or a workflow electronically.

Examples of the digital tools include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the recommendation system 102.

Digital experience, as described herein, includes experience that can be consumed through an electronic device. Examples of the digital experience include, but are not limited to, content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

The recommendation system 102 includes one or more devices that provide and execute one or more engines for providing one or more digital experiences to a user. The recommendation system 102 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like.

The recommendation system 102 also includes a data storage unit 112. The data storage unit 112 can be implemented as one or more databases or one or more data servers. The data storage unit 112 includes data that can be used by the engines of the recommendation system 102.

In some embodiments, the recommendation system 102 can be divided into two layers of engines. For example, Layer 1 includes core engines that provide workflows to the user and Layer 2 includes shared engines that are shared among the core engines. Any core engine can call any of the shared engines for execution of a corresponding task. In additional or alternative embodiments, the recommendation system 102 does not have layers, and each core engine can have an instance of the shared engines. In various embodiments, each core engine can access the data storage unit 112 directly or through the shared engines.

In some embodiments, the user of the computing device 104 visits a webpage or an application store to explore applications supported by the recommendation system 102. The recommendation system 102 can provide the applications under a "software as a service" (SaaS) model, or as a standalone application that can be installed on one or more of the computing devices 104, or any combination thereof.

In some embodiments, the user creates an account with the recommendation system 102 by providing user details and also by creating login details. In additional or alternative embodiments, the recommendation system 102 can automatically create login details for the user in response to receipt of the user details. The user can also contact the entity offering the services of the recommendation system 102 and can get the account created through the entity. The user details are received by a subscription engine 114 and stored as user data 116 in the data storage unit 112. In some embodiments, the user data 116 further includes account data 118, under which the user details are stored. In some embodiments, the user can also be prompted to install an application manager. The application manager enables the user to manage installation of various applications supported by the recommendation system 102.

In some embodiments, a user can opt for a trial account or a subscription to one or more engines of the recommendation system 102. Based on the trial account or the subscription details of the user, a user subscription profile 120 is generated by the subscription engine 114 and stored. The user subscription profile 120 is stored in the data storage unit 112 and indicates entitlement of the user to various products or services. The user subscription profile 120 also indicates a type of subscription, e.g., a free trial, a premium subscription, or a regular subscription.

Each engine of the recommendation system 102 also stores customer data 122 for the user in the data storage unit 112. The user or the entity of the user can have one or more customers, including potential customers, and hence, the one or more engines of the recommendation system 102 store the customer data 122. The customer data 122 can be shared across these engines or can be specific to each engine. In some embodiments, access data 124 is a part of the customer data 122. The access to the customer data 122 is controlled by an access control engine 126, which can be shared across the engines of the recommendation system 102 or each engine can have one instance of the access control engine 126. The access control engine 126 determines if the user has access to a particular customer data 122 based on the subscription of the user and access rights of the user.

A user of the recommendation system 102 can enable tracking of content while creating content or at any point. Various methods of tracking can be used. For example, tracking code can be embedded into the content for tracking and sending tracked data to the user data engine 128. The user data engine 128 tracks the data and stores the tracked data as user behavior data 130 or other data. The user data engine tracks the data and performs meaningful processing of the user behavior data 130 or other user data to provide various reports to the user. In addition, in some embodiments, the user data engine 128 also acts as a shared engine and is accessible by other engines to obtain meaningful analysis on the basis of which other engines can offer various functionalities to the user. In additional or alternative embodiments, each engine can have an instance of the user data engine 128, which is customized according to a need of that engine. In various embodiments, the user data engine 128 is used for tracking one or more types of content, such as mobile applications, video, image, website, document, advertisements, etc. In some embodiments, the user data engine 128 also supports predictive intelligence to provide predictions based on the user behavior data 130 or user data. In some embodiments, the user data engine 128 also stitches information tracked from various sources where the content is consumed and provides a holistic view (e.g., a 360 degree view) of the user behavior data 130 or other user data.

In some embodiments, the recommendation system 102 also includes a content personalization engine 132. The content personalization engine 132 enables the user to provide different digital experiences to the customers when different customers visit a same webpage or a same application of the user. The content personalization engine 132 provides various workflows to the user to create different versions of the webpage or application or the content and to perform AB testing. Based on the testing, the user may choose to provide different personalization for different sets of customers. The content personalization engine 132 also uses the customer data 122. The customer data 122 includes customer profiles. The customers, as described herein, also include mere visitors that are not customers yet. A customer profile includes one or more attributes of the customer. An attribute, as described herein, is a concept using which the customer can be segmented. Examples of the attribute include, but are not limited to, geographical location, age, gender, purchase capacity, language, habits, browsing trends, or any other attribute.

The customer data 122, at least some of which may be included in the user behavior data 130 or stored separately from the user behavior data 130, is generated by a customer segmentation engine 134 by collecting data from different sources including electronic sources, such as the user data engine 128, online forms, customer submitting data online, and other online sources, and non-electronic sources including paper forms and other offline sources. The customer data 122 can be shared between users and some of the customer data 122 can be specific to each user and not accessible by other users. The customer segments are used by the customer segmentation engine 134 to personalize content and show relevant content to the customers. In addition, the content personalization engine 132 provides automated workflows to enable the personalization including providing recommendations for the content that should be shown to a particular customer segment.

In various embodiments, the customer data 122 also includes data regarding devices used by the customers. The device data is used for stitching customer data. For example, a customer 1 may use device 1 to visit website A. The customer 1 may use device 2 to visit website B. The website A and the website B may belong to the same user. So, instead of considering customer 1 as two different customers, the data including at least one common identifier such as, for example, an e-mail identifier, helps the user to identify that the two different visits were made by the same customer 1. Also, by analyzing the customer data 122 and the user behavior data 130 or other user data, richer customer profiles or segments can be generated. Also, devices that correspond to the same customer can be identified resulting in providing more targeted digital experience to the customer and making benefit for the user.

In some embodiments, the recommendation system 102 includes the user data engine 128, a grouping engine 140, a personalization engine 142, and a recommendation engine 146.

The engines 128, 140, 142, 146 each include one or more instructions stored on a computer-readable storage medium and executable by processors of one or more computing devices. When executed by the one or more processors, the computer-executable instructions of the recommendation system 102 cause the recommendation system 102 to adapt recommendations provided to individual users by inferring the propensity of each user to listen to recommendations. In additional or alternative embodiments, the engines 128, 140, 142, 146 include hardware, such as a special purpose processing device to perform a certain function or group of functions. Additionally or alternatively, the engines 128, 140, 142, 146 each include a combination of computer-executable instructions and hardware.

In the example depicted in FIG. 1, one or more engines 128, 140, 142, 146 of the recommendation system 102 and the data storage unit 112 communicate via the data network 108. For example, the data storage unit 112 transmits prior user activity data 136 to the user data engine 128. Prior user activity data 136 includes, but is not limited to, data about a prior activity taken by a user of the one or more computing devices 104 or the recommendation system 102. Examples of prior user activity data 136 include, but are not limited to, data about a location or a sequence of locations previously visited by the user, data about an offer (e.g., a sales offer) or a series of offers previously made to the user, data about a series of purchases previously made by the user, data about a propensity for the user to accept a recommendation, data about one or more user models for the user, etc. In additional or alternative embodiments, the data storage unit 112 transmits user data 116 to the user data engine. The user data 116 includes, but is not limited to, any data associated with a user of the recommendation system 102 or the computing device 104. The user data 116 includes, for example, demographic data about the user, transaction data associated with the user, geographical location of the user, age of the user, gender of the user, purchase capacity of the user, language of the user, habits of the user, browsing trends of the user, any attribute of the user, or any other data associated with the user. In some embodiments, the user data engine 128 receives or obtains user data 116 or prior user activity data 136 from the one or more computing devices 104, the data storage unit 112, user input (e.g., if a user programs the user data engine 128 to include user behavior data 130 or other user data), or any other source.

In some embodiments, the recommendation system 102 uses the prior user activity data 136 or user data 116 as a basis for generating recommendations for users. For example, the grouping engine 140 is electrically or communicatively coupled to the user data engine 128 and the grouping engine 140 receives data obtained or received by the user data engine 128 (e.g., prior user activity data 136 or user data 116) and processes the data. In some embodiments, the grouping engine 140 uses the data to produce a transition matrix (also referred to as a "stochastic matrix") that reflects the historical probabilities associated with users transitioning between various states.

For example, the prior user activity data 136 or user data 116 includes data about various users and the grouping engine 140 receives the data about the various users from the user data engine 128. This data may include the various state transitions (also referred to as "trajectories") made by the various users, such as transitions between a collection of predefined locations in a theme park. The grouping engine 140 analyzes the transitions made by the users to produce a transition matrix that specifies a probability for a user transitioning between any two states. Using the location example, the transition matrix would specify the probability that users starting at location L1 would transition from L1 to location L2, the probability that the users would instead transition from L1 to location L3, and so on for each of the predefined locations.

In some embodiments, the grouping engine 140 is electrically or communicatively coupled to the personalization engine 142 and the personalization engine 142 receives or obtains data from the grouping engine 140. In some embodiments, the personalization engine 142 generates a personalized user model based on data obtained or received from the grouping engine 140, as well as an estimate of a propensity for the individual user for whom the user model is produced to accept a recommendation. For example, the personalization engine 142 receives data for the general transition matrix formed by the grouping engine 140 and an estimate of a propensity for the individual user for whom the user model is produced to accept a recommendation. The personalization engine 142 may express the user model as a Partially Observable Markov Decision Process (POMDP), where the transition matrix serves as the set of conditional transition probabilities between states, and the propensity of the user to accept a recommendation is the hidden state of the POMDP. In some embodiments, the personalization engine 142 may incorporate a reward function to be optimized in the user model (e.g., POMDP), where the reward function specifies a desirability for the user to transition to particular states. For instance, a marketer may provide a reward function that indicates state A (e.g., a location of retail store) has a reward value of 10, whereas the reward function indicates that state B (e.g., a lake or other recreational area) has a reward value of 1 because, for example, no direct revenue is generated for the marketer. More generally, the reward function expresses a notion of desirability of states from some perspective (e.g., from the marketer), but the actual reward function can be arbitrary. As a consequence of personalization, different user models may be created for each individual user for whom recommendations are provided.

In some embodiments, the recommendation system 102 uses the user model to provide recommended actions to a user. For example, the user data engine 128 obtains or receives other user behavior data 130. As an example, the user data engine 128 obtains or receives current user activity data 138 from the data storage unit 112. Current user activity data 138 includes, but is not limited to, data about a current activity taken by a user of the one or more computing devices 104 or the recommendation system 102. Examples of current user activity data 138 include, but are not limited to, data about a current activity of the user that relates to a recommendation, a current location of the user, an offer (e.g., a sales offer) currently being made to the user, data about a purchase currently being made by the user, etc. In some embodiments, the user data engine 128 receives or obtains current user activity data 138 from the one or more computing devices 104, the data storage unit 112, user input (e.g., if a user programs the user data engine 128 to include user behavior data 130 or other user data), or any other source.

In some embodiments, the recommendation engine 146 is electrically or communicatively coupled to the personalization engine 142 and the recommendation engine 146 receives or obtains data (e.g., a user model) from the personalization engine 142. The recommendation engine 146 determines a recommended action to be provided to a user based in part on data received or obtained from the personalization engine 142. In some embodiments, the recommendation system 102 outputs one or more actions of the recommended sequence of actions to the user.

In some embodiments, the recommendation engine 146 is electrically or communicatively coupled to the user data engine 128 and the recommendation engine 146 receives or obtains data from the user data engine 128. In some embodiments, the recommendation engine 146 updates the user model for a particular user with an estimate of the propensity for the user to accept a recommendation based on data obtained or received from the user data engine 128.

For example, as the recommendation engine 146 receives user data from the user data engine 128 and provides recommendations to the user based on a user model expressed as a POMDP, the user initiates activities that result in the user changing to different states (e.g., locations). The activities that the user undertakes may or may not correspond to the action that was recommended to her/him. As a result, the recommendation engine 146 sequentially adjusts an estimate of the propensity for the user to accept a recommendation based on whether the activity that the user undertook was the recommended action. The estimate of the propensity for the user to accept a recommendation may be expressed as a probability distribution over the hidden variable of interest (propensity) for the user model, and may also be referred to as a "belief." The recommendation engine 146 uses each user's propensity to accept a recommendation to provide personalized recommendations based on the user model. In this manner, the recommendation system 102 can iteratively learn the propensity for each user to listen to recommendations, which can thus be used to improve the recommendation of various actions to a user.

While in the examples described above, the recommendation system 102 adapts a user's propensity to accept recommendations (a hidden user preference) based on the location to which the user has transitioned, the present disclosure is not limited to such configurations. Rather, in other examples, the recommendation system 102 adapts a user's propensity to accept recommendations using any sequential user behavior data and improves the recommendation of various actions to a user in various applications.

In the example depicted in FIG. 1, a user can interface with the one or more computing devices 104 to access the recommendation system 102. In some embodiments, each of the computing devices 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In some embodiments, the recommendation system 102 is executed on the one or more computing devices 104 via a recommendation application 148. In this example, the computing devices 104 includes one or more of the components of the recommendation system 102.

Figure 2:
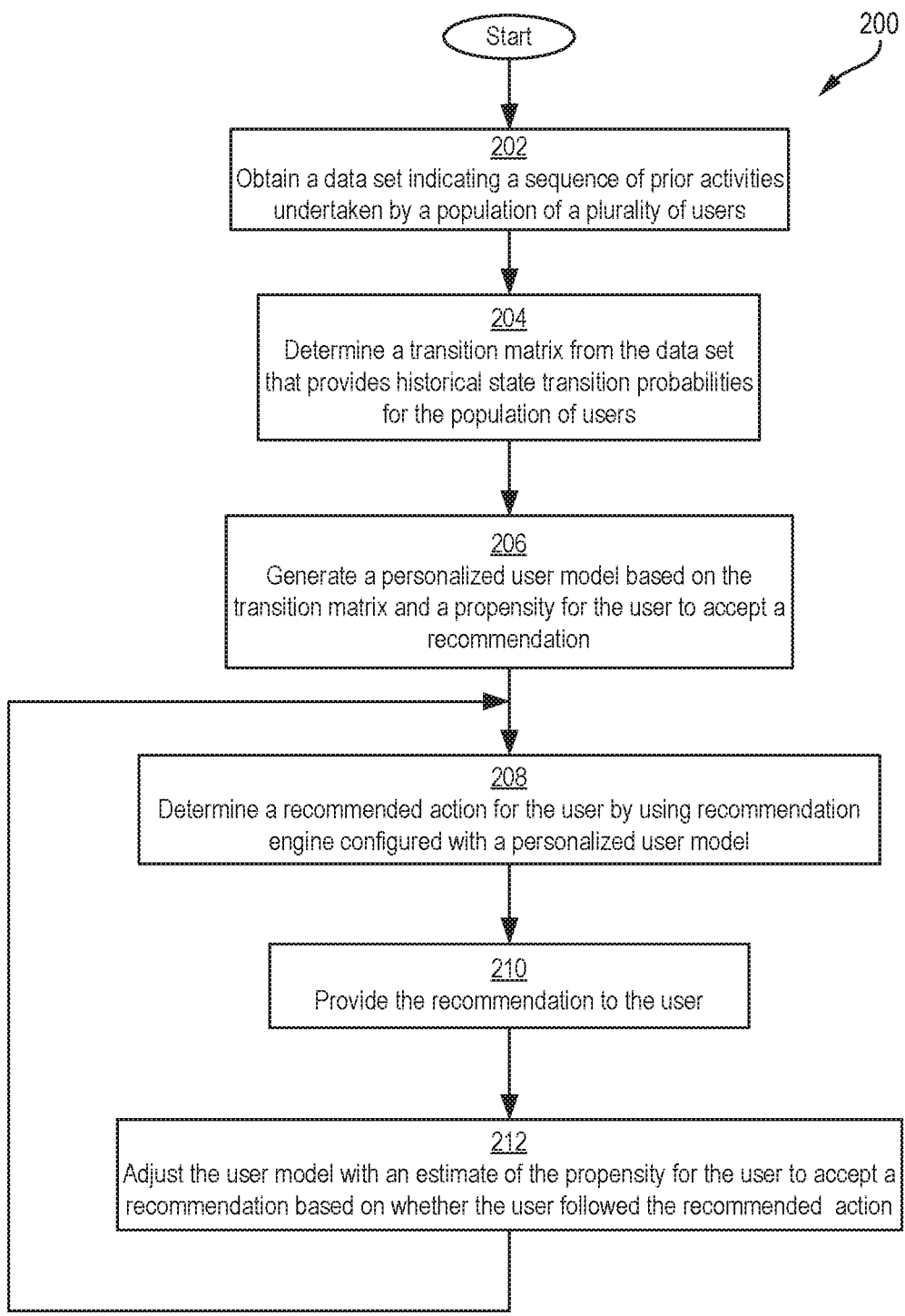
FIG. 2 is a flow chart depicting an example of a process for learning a propensity for a user to accept a recommendation and predicting user behavior based on sequential user behavior data to improve recommendation of various actions to the user, according to certain embodiments.

FIG. 2 is a flow chart depicting an example of a process 200 for learning user preferences and predicting user behavior based on sequential user behavior data to improve recommendation of various actions to a user. In some embodiments, one or more processing devices, such as, for example, the computing system described herein with respect to FIG. 4, implement operations depicted in FIG. 2 by executing suitable program code (e.g., the recommendation system 102 of FIG. 1) that implements one or more algorithms encompassed by the process 200. For illustrative purposes, the process 200 is described with reference to the examples depicted in FIG. 1, but other implementations are possible.

In block 202, a data set indicating a sequence of prior activities undertaken by a population of various users is obtained. In some embodiments, a user data engine 128 obtains the data set, which includes prior user activity data 136 or user data 116. For example, the user data engine 128 obtains or receives the data set from one or more computing devices 104, a data storage unit 112, user input (e.g., if a user programs the user data engine 128 to include the data set), or any other source.

In some embodiments, the user data engine 128 accesses the data set from a non-transitory computer-readable medium that is local to the computing system that executes the user data engine 128. Accessing the prior user activity data 136 or the user data 116 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the user data engine 128.

In additional or alternative embodiments, the user data engine 128 accesses, via a data network 108, at least some of the prior user activity data 136 or user data 116 from a non-transitory computer-readable medium that is remote from the computing system that executes the user data engine 128. Accessing the prior user activity data 136 or user data 116 involves transmitting suitable electronic signals via a network interface device that communicatively couples, via the data network 108, a computing system that executes the user data engine 128 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the user data engine 128, and stored in a random-access memory or other memory device that allows rapid retrieval of data for processing operations performed by the computing system that executes the user data engine 128.

In some embodiments, the data set obtained at block 202 includes data about a prior activity undertaken by various users of the computing devices 104 or the recommendation system 102 or any data associated with the user. For example, the data set includes data about a location or a sequence of locations previously visited by the user, data about an offer or a series of offers previously made to the user, a series of purchases previously made by the user, demographic data about the user, transaction data associated with the user, geographical location of the user, age of the user, gender of the user, purchase capacity of the user, language of the user, habits of the user, browsing trends of the user, any attribute of the user, etc.

In block 204, a transition matrix is determined from the data set, where the transition matrix provides historical state transition probabilities for the general population of users. In some embodiments, one or more processing devices execute a grouping engine 140 to determine the state transition counts present in the data obtained at block 202. The grouping engine 140 further normalizes the transition counts to form a transition matrix (also referred to as a Markov chain) that reflects the historical probability of user transition from one of a collection of states (e.g., locations) to another state.

In some embodiments, the grouping engine 140 retrieves code for producing the transition matrix from a non-transitory computer-readable medium (e.g., by communicating suitable signals to a non-transitory computer-readable medium via a data bus or a data network 108). The grouping engine 140 executes the retrieved code using the data set obtained at block 202 or a subset of the data set.

For example, assume that in a theme park there are three different predefined locations to which users may visit, where these three locations are represented as locations A, B, and C. While there may be other locations in the park where users can go, this example focuses on transitions between these three locations. Based on the transitions of the users specified in the obtained data set, such as from block 202, the data set indicates that of the people who are at location A, 50% of those go to location B next time and 30% go to location C next time, whereas the remainder (20%) return to location A next time. The data set also indicates that of the people who are at location B, 50% of those go to location A next time and 40% go to location C next time, whereas the remainder (10%) return to location B next time. Lastly, for those people who are at location C, 30% of those go to location A next time and 40% go to location B next time, whereas the remainder (30%) return to location C next time. Consequently, the historical probabilities for this simplified example described above can be expressed as a transition matrix, such as shown below, that reflects these probabilities:

|   | A  | B  | C  |
|---|----|----|----|
| A | .2 | .5 | .3 |
| B | .5 | .1 | .4 |
| C | .3 | .4 | .3 |

In block 206, a personalized user model is generated based on the historical transition matrix (also referred to as a Markov chain) and a propensity for the individual user to accept a recommendation. In some implementations, the user model is expressed as a POMDP that is converted from the transition matrix. A POMDP is characterized by hidden and observed states, actions, and rewards. The hidden state of the POMDP is the individual user's propensity to accept a recommendation (also referred to as a "propensity to listen" or simply a "propensity"), which parameterizes the transitions of the POMDP. The observed states are everything that is observed by the recommendation system 102, for example, the current location of the user, the time of the day, the day of the week, etc. The actions of the POMDP are the recommendations themselves. One example of a recommendation is a set of possible subsequent locations (e.g., A, B, C) in which a user could be interested. Another example of a recommendation is a set of actions that would result in the movement of the user to certain locations in which the user may be interested.

In some embodiments, a reward function designates desirability of individual locations or other states. For example, a high reward at some location would mean that the provider of the reward function (e.g., a vendor) wants to drive users to that location. The recommendation system 102 may optimize the POMDP or other user model to maximize the rewards from the recommendations made to the user over a designated time period (also referred to as a "horizon"). For example, the horizon used in the context of visitors to a theme park may be the length of the user's visit to the park.

In some embodiments, the individual user's propensity to accept a recommendation corresponds to a hidden state of the POMDP. The propensity is expressed in the user model as a probability distribution. That is, the user model assumes that, for each user, a value representing the user's propensity to accept a recommendation does exist, but the recommendation system 102 cannot directly observe the underlying state to determine the value. Instead, the user model maintains a probability distribution over the set of possible states for the propensity that evolves based on observations of the recommendation system 102. The recommendation system 102, when configured with the user model, adjusts the generalized probabilities from the transition matrix based on a propensity for the user to accept a recommendation. In some implementations, for new users, the probability distribution representing a propensity to listen may simply be a uniform probability distribution. The uniform probability distribution represents an equal probability among multiple possible values of a propensity (e.g. all values) to accept a recommendation. For existing users, the probability distribution representing a user's propensity to accept a recommendation may be stored in the user data 116. The stored propensity may be retrieved by the recommendation system 102 and further adapted during subsequent uses of the recommendation system 102.

In block 208, a recommended action (or recommended state as a result of an action) is determined for the user by the recommendation engine 146 configured with a personalized user model. To this end, the recommendation engine 146 receives current user activity data 138 and consults the user model to determine the recommended action from among a collection of possible actions. In some embodiments, a recommended action generated by the recommendation engine 146 is highly personalized. This personalization includes accounting for the best estimate of the propensity of the user to accept a recommendation.

In some embodiments, because the recommendation engine 146 does not directly observe the value of the user's propensity (i.e., the value of the user's propensity is a hidden state), the recommendation engine 146 makes decisions without directly observing the true propensity of the user. However, by receiving observations (e.g., current user activities), the recommendation engine 146 may refine its belief in the true state of the propensity by updating the probability distribution of the propensity. As a consequence of this configuration, the recommendation engine 146, which is configured with a user model, may generate recommendations purely because these recommendations improve the estimate of the propensity, thereby allowing the recommendation engine 146 to make better recommendations in the future. For example, if a new user for whom no refined propensity is known begins using the recommendation system 102, the recommendation engine 146 may make some improbable recommendations in order to refine an estimate of the user's propensity, where "improbable" is with respect to the general population, as indicated by the transition matrix. The rationale being that if a user performs a recommended action that is improbable, this would tend to suggest the user has a high propensity to accept recommendations.

it should be noted that in embodiments in which the space of latent variables is finite (e.g., only 10 possible values for the propensity to listen of each user), a POMDP model can be reduced to a finite set of Markov Decision Processes (MDPs), which can be solved using linear optimization, dynamic optimization, and/or other known techniques. As a result of solving the MDPs, all possible optimal recommendations over all possible user types (i.e., propensity values) can be pre-calculated. In this case, the recommendation engine 146 only needs to maintain a belief over the propensities, and at each time step sample one draw from this belief and furnish the corresponding recommendation to the user. This is an instance of Thompson sampling in the context of parametric MDPs.

In block 210, the recommendation is provided to the user via one or more computing devices 104 with which he/she accesses the recommendation system 102. In some embodiments, each of the computing devices 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In some embodiments, the recommendation system 102 is executed on the one or more computing devices 104 via a recommendation application 148. In this example, the computing devices 104 includes one or more of the components of the recommendation system 102.

In block 212, an estimate of the propensity for the user to accept a recommendation is adjusted in the user model based on whether the user followed the recommended action. To that end, user data indicating a current activity of the user is obtained. In some embodiments, the user data engine 128 obtains the user data, which includes user behavior data 130 or current user activity data 138. For example, the user data engine 128 obtains or receives the user data from one or more computing devices 104, the data storage unit 112, user input (e.g., if a user programs the user data engine 128 to include the user data), or any other source. Examples of current user activity data 138 include, but are not limited to, data about a current location of the user, data about an offer (e.g., a sales offer) currently being made to the user, data about a purchase currently being made by the user, etc.

In some embodiments, the user data engine 128 accesses the user data from a non-transitory computer-readable medium that is local to the computing system that executes the user data engine 128. Accessing the current user activity data 138 involves transmitting suitable electronic signals via a data bus that communicatively couples the non-transitory computer-readable medium and the processing device. These signals cause at least some of the data from the non-transitory computer-readable medium to be stored in a random-access memory or other memory device that allows rapid retrieval of data for processing operations performed by the computing system that executes the user data engine 128.

In additional or alternative embodiments, the user data engine 128 accesses, via a data network 108, at least some of the current user activity data 138 from a non-transitory computer-readable medium that is remote from the computing system that executes the user data engine 128. Accessing the current user activity data 138 involves transmitting suitable electronic signals via a network interface device that communicatively couples, via a data network, a computing system that executes the user data engine 128 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the user data engine 128, and stored in a random-access memory or other memory device that allows rapid retrieval of data for processing operations performed by the computing system that executes the user data engine 128.

As the current user activity data 138 is received, the recommendation engine 146 sequentially adjusts an estimate of the propensity for the user to accept a recommendation based on whether the activity that the user undertook was the recommended action. For example, if the recommendation engine 146 recommended that the user visit location A, and the user visited location A, the user would be determined to have followed the recommended action. Alternatively, if the user had instead visited a different location instead of location A, the user would be determined to have not followed the recommended action. The estimate of the propensity for the user to accept a recommendation may be expressed as a probability distribution over the hidden variable of interest (propensity) for the user mode. In response to a current activity performed by the user, the recommendation engine 146 may adjust the probability distribution for the propensity using Bayes' rule, in light of whether the current activity was the recommended action.

For example, the propensity for the user to accept a recommendation may be expressed as a probability distribution over all possible values for the propensity (e.g., a probability (0.0-1.0) for each possible propensity value (1-10), where the sum of the individual propensity probabilities is 1). Following a determination of whether the current activity was the recommended action (i.e., an outcome), for each possible propensity value, Bayes' rule updates the corresponding probability with an adjustment indicating the likelihood of the outcome that occurred if the actual value of the propensity (i.e., an unobservable hidden state) was the respective possible propensity value. The adjustment can be determined using a likelihood function that is the propensity-parameterized user model, such as expressed by:

$$p(s' \mid s, a, \theta) \propto (\pi_{s,s'=a})^{\frac{1}{\theta}}$$

where $\pi_{s,s'}$ denotes the default transition probability to move to state s' from state s, and $\theta$ represents the propensity value.

Formally, updating the estimate of the propensity can be expressed as:

$$p(\theta \mid s, a^*, s') \propto p(s' \mid s, a^*, \theta) p(\theta)$$

where $\theta$ represents the propensity value, $p(\theta)$ represents the probability distribution for the propensity, s represents the current state, and s' represents the new state resulting from the action a*.

The recommendation engine 146 uses each user's propensity to accept a recommendation to provide personalized recommendations based on the user model. In this manner, the recommendation system 102 can iteratively learn the propensity for each user to listen to recommendations, which can thus be used to improve the recommendation of various actions to a user. Thereafter, execution of the process 200 returns to block 208, where subsequent recommendations are determined using the adjusted estimate of the propensity.

Figure 3:
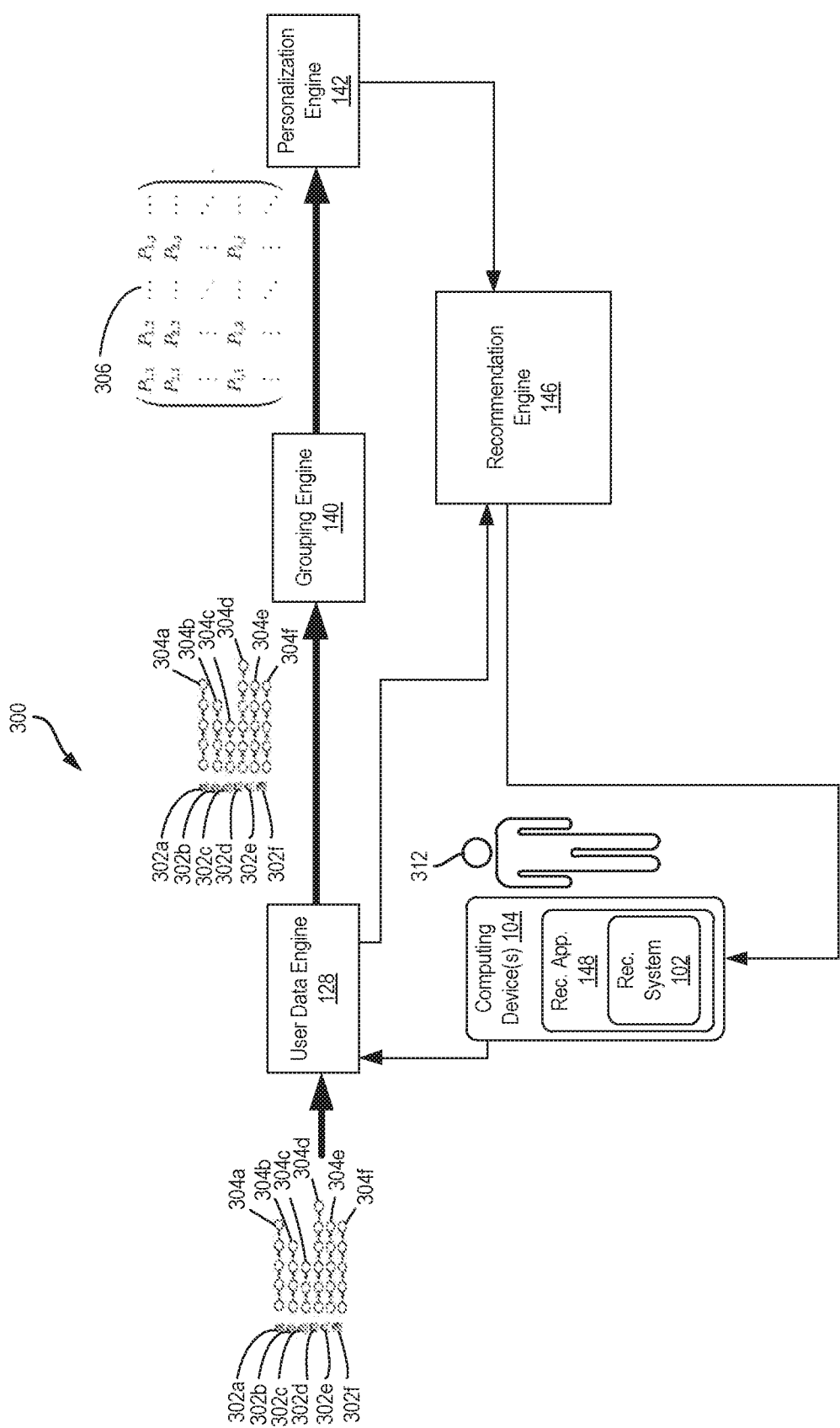
FIG. 3 illustrates an example of a recommendation system that learns a propensity for a user to accept a recommendation and predicts user behavior based on sequential user behavior data to improve recommendation of various actions to the user, according to certain embodiments.

FIG. 3 illustrates an example of a recommendation system 300 that generates location or point-of-interest recommendations for users using an automated approach that is personalized by inferring the propensity of each individual user to listen to recommendations. The recommendation system 300 is described with reference to the environment 100 of FIG. 1 and the process 200 of FIG. 2, but other implementations are possible.

In the example depicted in FIG. 3, a data set indicating trajectories or sequences 304a-f of prior locations visited by various users 302a-f is obtained by the user data engine 128 (e.g., in block 202). The user data engine 128 transmits the data set to the grouping engine 140, which processes the data to produce a transition matrix 306 that reflects the historical probabilities associated with users 302a-f transitioning between the various locations, some or all of which may be represented in the trajectories 304a-f. For example, the transition matrix 306 may specify the probability that users starting at location L1 would transition from L1 to location L2, the probability that the users would instead transition from L1 to location L3, and so on for each of the predefined locations.

The transition matrix 306 and potentially other data is provided to the personalization engine 142, which generates a personalized user model based on the data obtained from the grouping engine 140 (e.g., in block 206). In particular, the user model is personalized to include an estimate of a propensity for an individual user, such as the user 312, for whom the user model is produced to accept a recommendation. In some embodiments, the creation of a user model for the user 312 may be initiated upon the occurrence of the user executing the recommendation application 148 with which to receive recommendations. For example, the personalization engine 142 receives data for the general transition matrix 306 formed by the grouping engine 140 and an estimate of a propensity for the individual user 312 for whom the user model is produced to accept a recommendation. If a previously created estimate of the propensity exists, such as in the user behavior data 130 or user data 116, this estimate may be used by the personalization engine 142 to create the user model, else an initial estimate of the propensity may be used, such as a uniform probability distribution.

In some embodiments, the personalization engine 142 expresses the user model as a POMDP. In a POMDP user model, the transition matrix 306 serves as the set of conditional transition probabilities between locations (i.e., states) and the propensity of the user to accept a recommendation is a hidden state of the POMDP. In some embodiments, the personalization engine 142 may incorporate a reward function to be optimized in the user model (e.g., POMDP), where the reward function specifies a desirability for the user to transition to particular states. As a consequence of personalization, different user models may be created for each individual user for whom recommendations are provided.

The user data engine 128 obtains or receives user data indicating a current location of the user 312 (e.g., in block 208). In some embodiments, the user data also includes other current data associated with the user, such as time of day, weather conditions, etc. For example, the computing device 104 includes a global positioning system (GPS) or other geographic location (geo-location) service for providing data indicating the current location of the user 312 to the user data engine 128. In this example, the recommendation engine 146 receives the data indicating the current location of the user 312 from the user data engine 128. In block 210, the recommendation engine 146 determines a recommended location to be provided to a user based in part on the user model (incorporating the propensity to listen) and the current location of the user 312 that is indicated by the received user data.

The recommendation engine 146 provides the recommended location to the computing device(s) 104 for the user 312, as described above with respect to block 210. The user can choose to visit the recommended location or can go to a different location. If the user has moved to another location (as indicated by the current user activity data 138), the recommendation engine 146 adjusts the propensity for the user to accept a recommendation based on the user having moved to the recommended location. For example, if the recommendation engine 146 recommended that the user visit location A, and the user visited location A, the user would be determined to have followed the recommended action. Alternatively, if the user had instead visited a different location instead of location A, the user would be determined to have not followed the recommended action. The estimate of the propensity for the user to accept a recommendation may be expressed as a probability distribution over the hidden variable of interest (propensity) for the user model. In response to a current activity performed by the user, the recommendation engine 146 may adjust the probability distribution for the propensity using the Bayes rule, in light of whether the current activity was the recommended action. The recommendation engine 146 uses each user's propensity to accept a recommendation to provide personalized recommendations based on the user model. In this manner, the recommendation system 102 can iteratively learn the propensity for each user to listen to recommendations, which can thus be used to improve the recommendation of various actions to a user. In some implementations, the estimate of the propensity to listen for the user 312 and/or the user model personalized for the user 312 may be stored in the user data 116 or elsewhere within the data storage unit 112.

While in the examples described in FIG. 3, the recommendation system 300 adapts a user's propensity to listen and provides recommendations to the user based on the user transitioning to different physical locations, the present disclosure is not limited to such configurations. Rather, in other examples, the recommendation system 300 can use any sequential user behavior data to improve the recommendation of various actions to the user in various applications.

System Implementation Example

Figure 4:
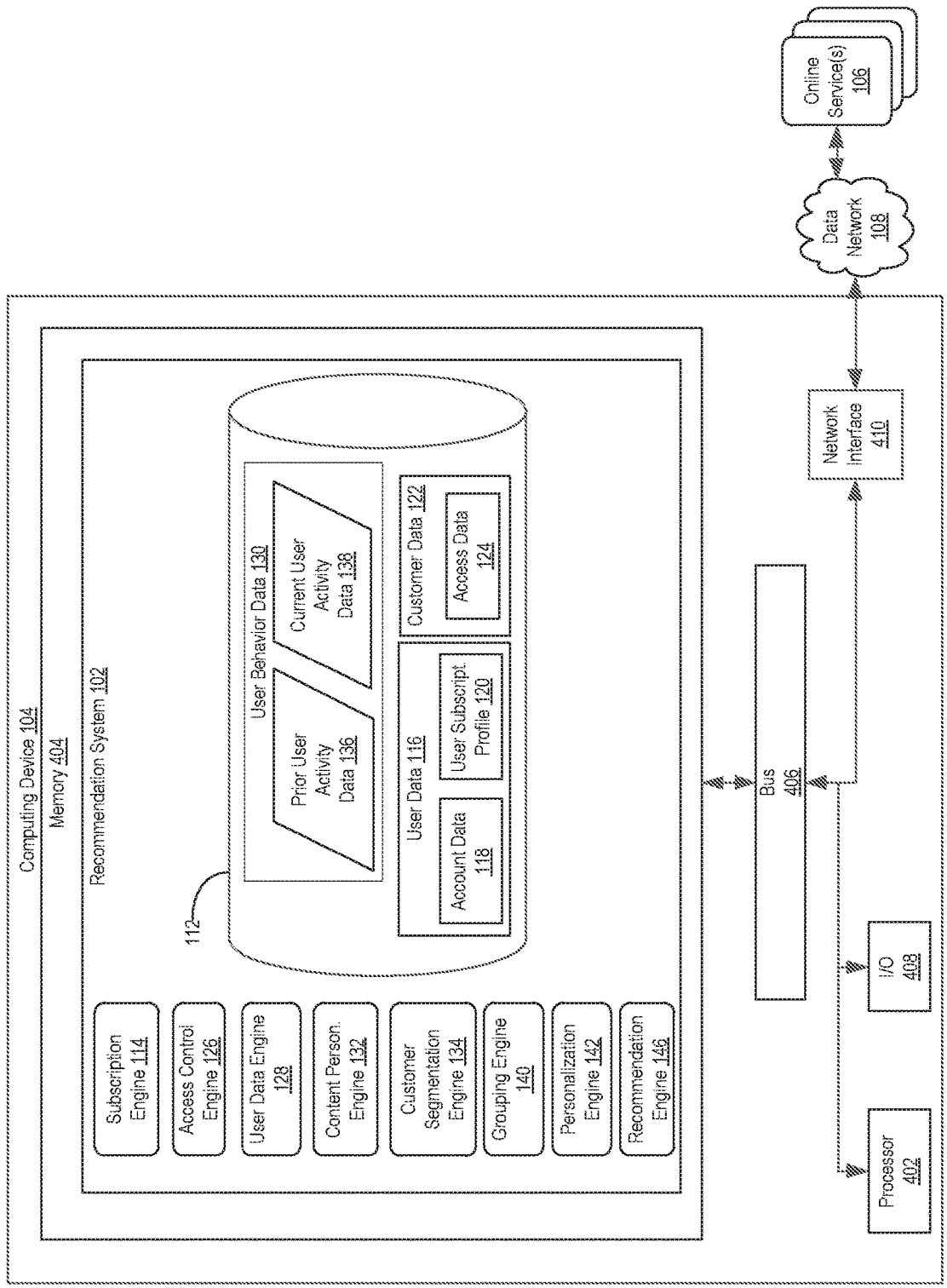
FIG. 4 is an example of a block diagram of a computing device that executes a recommendation system for learning a propensity for a user to accept a recommendation and predicting user behavior based on sequential user behavior data to improve recommendation of various actions to the user, according to certain embodiments.

Any suitable computing system or group of computing systems can be used for performing the operations described herein. FIG. 4 is an example of a block diagram of a computing device 104 that executes a recommendation system 102 to perform the operations described herein.

The depicted example of the computing device 104 includes one or more processors 402 communicatively coupled to one or more memory devices 404. The processor 402 executes computer-executable program code stored in the memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including one or more processors 402 that are configured by program code to implement the operations described above, such as the operations depicted in FIG. 2 that are described with respect to processing devices.

The memory device 404 includes any suitable non-transitory computer-readable medium for storing the recommendation system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. One or more memory devices 404 are used to implement the operations described above, such as the operations depicted in FIG. 2 that are described with respect to one or more non-transitory computer-readable media.

The computing device 104 may also include a number of external or internal devices such as input or output devices. For example, the computing device 104 is shown with an input/output ("I/O") interface 408 that can receive input from input devices or provide output to output devices. A bus 406 can also be included in the computing device 104. The bus 406 can communicatively couple one or more components of the computing device 104. In some embodiments, the bus 406 is used to implement the operations described above with respect to FIG. 2 that involve communicating signals via a data bus.

The computing device 104 executes program code that configures the processor 402 to perform one or more of the operations described above with respect to FIGS. 1-3. The program code includes, for example, the user data engine 128, grouping engine 140, personalization engine 142, recommendation engine 146, content personalization engine 132, customer segmentation engine 134, subscription engine 114, access control engine 126 or other suitable applications that perform one or more operations described herein. The program code may be resident in the memory device 404 or any suitable computer-readable medium and may be executed by the processor 402 or any other suitable processor. In some embodiments, the program code described above is stored in the memory device 404, as depicted in FIG. 4. In additional or alternative embodiments, the program code described above is stored in one or more memory devices accessible via a data network.

The computing device 104 accesses the user behavior data 130 in any suitable manner. In some embodiments, the user behavior data 130 is stored in one or more memory devices accessible via a data network 108, as in the example depicted in FIG. 4. In additional or alternative embodiments, some or all of the user behavior data 130 is stored in the memory device 404.

The computing device 104 depicted in FIG. 4 also includes at least one network interface 410. The network interface 410 includes any device or group of devices suitable for establishing a wired or wireless data connection to one or more data networks 108. Non-limiting examples of the network interface 410 include an Ethernet network adapter, a modem, and/or the like. The computing device 104 is able to communicate with one or more online services 106 using the network interface 410. In some embodiments, the network interface 410 is used to implement the operations described above with respect to FIG. 2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

Therefore, the following is claimed:

1. A method, comprising:
receiving, in a computing device, a first location of a user, wherein the first location is proximate to a location included in a collection of predefined locations;
generating, in the computing device, a personalized user model that is a Partially Observable Markov Decision Process (POMDP) model, wherein conditional transition probabilities between observed states in the POMDP model are location transition probabilities generated using sequences of locations previously visited by a general population of users and a hidden state of the POMDP model is a propensity for the user to accept a recommendation, the propensity having a hidden propensity value;
determining, in the computing device, a first recommended action specifying a first recommended location for the user from among the collection of predefined locations by using a recommendation engine configured with the personalized user model;
sending, by the computing device, the first recommended location to the user;
determining, by the computing device, that the user has moved to a second location;
updating, by the computing device and based on whether the second location is the first recommended location, the POMDP model by at least adjusting a probability distribution for an estimate of the propensity for the user to accept a recommendation,
wherein adjusting the probability distribution comprises modifying the probability distribution such that a probability of the hidden propensity value for a user given (1) a current observed state of the user, (2) a next observed state of the user, and (3) the first recommended action is proportional to a product of (a) a probability of the hidden propensity value according to a probability distribution of available propensity values and (b) a probability of the next observed state of the user given (i) the current observed state of the user, (ii) the first recommended action, and (iii) the hidden propensity value; and
determining, by the computing device, a second recommended action specifying a second recommended location for the user by using the recommendation engine configured with the personalized user model and the adjusted probability distribution of the propensity for the user to accept a recommendation.

2. The method of claim 1, wherein adjusting the probability distribution for the estimate comprises adjusting the probability distribution using Bayes' rule, wherein using Bayes' rule comprises updating each probability of the probability distribution based on a likelihood function.

3. The method of claim 1, wherein determining the first recommended action comprises solving the POMDP using Thompson sampling, wherein solving the POMDP using Thompson sampling comprises:
reducing the POMDP to a finite set of Markov Decision Processes (MDP)s;
solving each of the MDPs and caching an optimal action for each possible value of the propensity;
sampling a plausible propensity value from the probability distribution for the estimate of the propensity for the user to accept a recommendation; and
identifying the first recommended action as the optimal action for the plausible propensity value of the user.

4. The method of claim 1, wherein the recommendation engine is further configured by the personalized user model to maximize a reward function, wherein the reward function indicates a desirability for individual ones of the predefined locations.

5. The method of claim 1, further comprising adjusting, by the computing device, the probability distribution for the estimate each time the recommendation engine determines that the user moves to another location subsequent to another recommended location being sent to the user.

6. The method of claim 1, further comprising storing, in the computing device, the estimate of the propensity for the user to accept a recommendation, wherein subsequent recommendations for the user are initially generated based on the stored estimate of the propensity for the user to accept a recommendation.

7. The method of claim 1, wherein a uniform distribution is initially used for the probability distribution representing the estimate of the propensity for the user to accept a recommendation.

8. A system, comprising:
a computing device comprising a memory and a processor; and
a recommendation engine stored in the memory and executed by the processor, the recommendation engine comprising a personalized user model that is a Partially Observable Markov Decision Process (POMDP) model, wherein conditional transition probabilities between observed states in the POMDP model are state transition probabilities obtained from a general population of users and a hidden state of the POMDP model is a propensity for a user to accept a recommendation, the propensity having a hidden propensity value, wherein the recommendation engine further comprises logic that, when configured by the personalized user model:

receives a first observed state for the user that is one of a collection of predefined states associated with possible user activities;

determines a first recommended action for the user to transition from the first observed state to a second observed state of the collection of predefined states base d on the personalized user model and the first observed state;

sends the first recommended action to the user;

determines that the user has performed a first activity that transitions from the first observed state;

adjusts a probability distribution for an estimate of the propensity for the user to accept a recommendation, wherein adjusting the probability distribution comprises modifying the probability distribution such that a probability of the hidden propensity value for a user given (1) a current observed state of the user, (2) a next observed state of the user, and (3) the first recommended action is proportional to a product of (a) a probability of the hidden propensity value according to a probability distribution of available propensity values and (b) a probability of the next observed state of the user given (i) the current observed state of the user, (ii) the first recommended action, and (iii) the hidden propensity value; and determines a second recommended action for the user by using the recommendation engine configured with the personalized user model and the adjusted probability distribution of the propensity for the user to accept a recommendation.

9. The system of claim 8, wherein the collection of predefined states comprises different webpages, different geographic locations, or different purchases.

10. The system of claim 8, wherein adjusting the probability distribution for the estimate comprises adjusting the probability distribution using Bayes' rule, wherein using Bayes' rule comprises updating each probability of the probability distribution based on a likelihood function.

11. The system of claim 8, wherein the recommendation engine is further configured by the personalized user model to maximize a reward function, wherein the reward function indicates a desirability for individual ones of the predefined states.

12. The system of claim 8, wherein the recommendation engine further comprises logic that adjusts the probability distribution for the estimate each time the recommendation engine determines that the user transitions to another state subsequent to another recommended action being sent to the user.

13. The system of claim 8, wherein determining the first recommended action comprises solving the POMDP using Thompson sampling, wherein solving the POMDP using Thompson sampling comprises:

reducing the POMDP to a finite set of Markov Decision Processes (MDP)s;

solving each of the MDPs and caching an optimal action for each possible value of the propensity;

sampling a plausible propensity value from the probability distribution for the estimate of the propensity for the user to accept a recommendation; and identifying the first recommended action as the optimal action for the plausible propensity value of the user.

14. A non-transitory computer-readable medium embodying a program for generating personalized recommendations for users by inferring a propensity of each individual user to accept a recommendation, the program executable by a processor in a computing device, comprising:

code that receives a first location of a user, wherein the first location is proximate to a location included in a collection of predefined locations;

code that generates a personalized user model that is a Partially Observable Markov Decision Process (POMDP) model, wherein conditional transition probabilities between observed states in the POMDP model are location transition probabilities generated using sequences of locations previously visited by a general population of users and a hidden state of the POMDP model is a propensity for the user to accept a recommendation, the propensity having a hidden propensity value;

code that determines a recommended action specifying a recommended location for the user from among the collection of predefined locations by using a recommendation engine configured with the personalized user model;

code that sends the recommended location to the user;

code that determines that the user has moved to a second location; and code that adjusts a probability distribution for an estimate of the propensity for the user to accept a recommendation based on whether the second location is the recommended location, wherein adjusting the probability distribution comprises modifying the probability distribution such that a probability of the hidden propensity value for a user given (1) a current observed state of the user, (2) a next observed state of the user, and (3) the recommended action is proportional to a product of (a) a probability of the hidden propensity value according to a probability distribution of available propensity values and (b) a probability of the next observed state of the user given (i) the current observed state of the user, (ii) the recommended action, and (iii) the hidden propensity value.

15. The non-transitory computer-readable medium of claim 14, wherein adjusting the probability distribution for the estimate comprises adjusting the probability distribution using Bayes' rule, wherein using Bayes' rule comprises updating each probability of the probability distribution based on a likelihood function.

16. The non-transitory computer-readable medium of claim 14, wherein determining the recommended action comprises solving the POMDP using Thompson sampling, wherein solving the POMDP using Thompson sampling comprises:

reducing the POMDP to a finite set of Markov Decision Processes (MDP)s;

solving each of the MDPs and caching an optimal action for each possible value of the propensity;

sampling a plausible propensity value from the probability distribution for the estimate of the propensity for the user to accept a recommendation; and identifying the recommended location as the optimal action for the plausible propensity value of the user.

17. The non-transitory computer-readable medium of claim 14, wherein the program further comprises code that stores the estimate of the propensity for the user to accept a recommendation, wherein subsequent recommendations for the user are initially generated based on the stored estimate of the propensity for the user to accept a recommendation.

* * * * *